(12) United States Patent
Dolga et al.

(10) Patent No.: US 12,619,430 B2
(45) Date of Patent: May 5, 2026

(54) SYSTEM AND METHOD FOR EVIDENCING DEVELOPER DOMAIN SPECIFIC SKILLS

(71) Applicant: JPMorgan Chase Bank, N.A., New York, NY (US)

(72) Inventors: Rares Dolga, London (GB); Yulong Pei, Eindhoven (NL); Vali Tawosi, London (GB); Salwa Husam Alamir, Bournemouth (GB); Sameena Shah, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 293 days.

(21) Appl. No.: 18/379,408

(22) Filed: Oct. 12, 2023

(65) Prior Publication Data

US 2025/0123841 A1 Apr. 17, 2025

(51) Int. Cl.
*G06F 8/77* (2018.01)
*G06Q 10/0631* (2023.01)

(52) U.S. Cl.
CPC ....... *G06F 8/77* (2013.01); *G06Q 10/063112* (2013.01)

(58) Field of Classification Search
None
See application file for complete search history.

(56) References Cited

U.S. PATENT DOCUMENTS

| | | | | |
|---|---|---|---|---|
| 2012/0072252 | A1* | 3/2012 | Deegan | G06Q 10/063 705/7.11 |
| 2017/0344927 | A1* | 11/2017 | Coletta | G06Q 10/063118 |
| 2019/0188742 | A1* | 6/2019 | Vasudevan | G06Q 10/063112 |
| 2020/0160252 | A1* | 5/2020 | Sahni | G06Q 10/063112 |
| 2021/0358065 | A1* | 11/2021 | Aguilar Achiaga | G06Q 50/2057 |
| 2022/0076187 | A1* | 3/2022 | Blum | G06N 20/00 |
| 2022/0391183 | A1* | 12/2022 | Yuan | G06N 3/04 |
| 2023/0095036 | A1* | 3/2023 | Tripuraneni | G06Q 10/1053 705/7.42 |
| 2025/0094929 | A1* | 3/2025 | Mishra | G06Q 10/1053 |

OTHER PUBLICATIONS

J. Caldeira, F. Brito e Abreu, J. Cardoso, R. Ribeiro and C. Werner, "Profiling Software Developers with Process Mining and N-Gram Language Models," Jan. 17, 2021, arXiv:2101.06733v1 [cs.SE]. (Year: 2021).*
T. Dey, A. Karnauch and A. Mockus, "Representation of Developer Expertise in Open Source Software," Feb. 2, 2021, arXiv: 2005. 10176v3 [cs.SE]. (Year: 2021).*

* cited by examiner

*Primary Examiner* — Andrew M. Lyons
(74) *Attorney, Agent, or Firm* — Greenblum & Bernstein, P.L.C.

(57) ABSTRACT

A method and system for evidencing skills of a developer are disclosed. The method includes extracting, from various databases, a list of terms and definitions for identifying skills, and grouping the identified skills for forming at least one ontology based on similarity. The method further includes acquiring raw data and performing data cleaning on the raw data for identifying at least one domain-specific skill. Subsequently, skill matching is performed by comparing the at least one domain-specific skill against the at least one ontology for determining that the at least one ontology is evidenced for the developer. The method further includes performing analytics to display the evidenced at least ontology and corresponding level, and automatically assigning the at least one task based on the performed analytics.

18 Claims, 7 Drawing Sheets

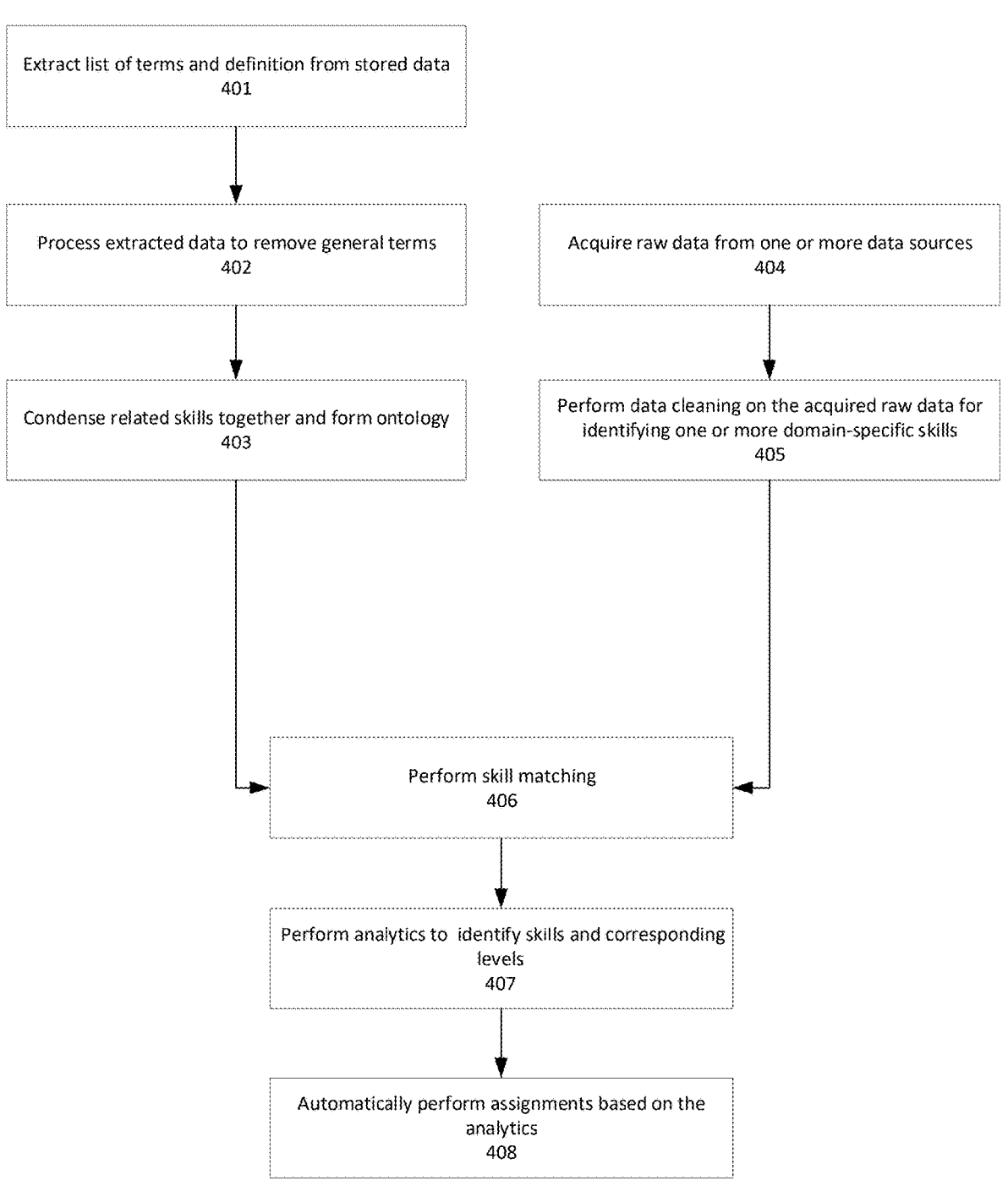

Extract list of terms and definition from stored data
401

Process extracted data to remove general terms
402

Acquire raw data from one or more data sources
404

Condense related skills together and form ontology
403

Perform data cleaning on the acquired raw data for identifying one or more domain-specific skills
405

Perform skill matching
406

Perform analytics to identify skills and corresponding levels
407

Automatically perform assignments based on the analytics
408

FIG. 6

```
Raw Message: Raw Message 1
Skills: Extracted Skills 1

Raw Message: Raw Message 2
Skills: Extracted Skills 2

Raw Message: Raw Message 3
Skills: Extracted Skills 3

Raw Message: Raw Message 4
Skills: Extracted Skills 4

Raw Message: Raw Message Test
Skills:
```

SYSTEM AND METHOD FOR EVIDENCING DEVELOPER DOMAIN SPECIFIC SKILLS

TECHNICAL FIELD

This disclosure generally relates to data processing. More specifically, the present disclosure generally relates to performing developer domain skill extraction for authenticating indicated skillset.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Extracting skills of a developer may be beneficial for performing job matching, as well as for providing recommendation for training and prioritization of work. Although external tools be available in the public domain, which may be utilized to extract skills of a developer, such skills are listed based on a subjective view of the authoring developer. In other words, skills listed via such external tools may not be vetted. Accordingly, discrepancies may exist between the skills listed on the public domain and actual skill possessed by the respective author. Similarly, at least since the skill listed by the developer is solely dependent on the developer listing such skills, some skills possessed by the developer may not be listed on the external tools and hidden from project managers.

SUMMARY

According to an aspect of the present disclosure, a method for evidencing skills of a developer is provided. The method includes extracting, by a processor and from multiple databases, a list of terms and corresponding definitions; removing, by the processor, at least one general term from the extracted list of terms and corresponding definitions for identifying multiple skills; grouping, by the processor, the identified skills for forming at least one ontology based on similarity; acquiring, by the processor and from one or more data sources, raw data; performing, by the processor, data cleaning on the acquired raw data; identifying, by the processor, at least one domain-specific skill from the cleaned raw data; performing, by the processor, skill matching by comparing the at least one domain-specific skill against the at least one ontology; when the at least one domain-specific skill matches with the at least one ontology, determining that the at least one ontology is evidenced for the developer; performing, by the processor, analytics to identify and display, on a display, the evidenced at least one ontology and corresponding level; and automatically assigning, by the processor, at least one task based on the performed analytics.

According to another aspect of the present disclosure, the multiple databases includes a glossary storage and a document storage.

According to another aspect of the present disclosure, the grouping is performed using affinity clustering.

According to yet another aspect of the present disclosure, the skill matching is performed using cosine similarity of embeddings with all of the terms in the at least one ontology.

According to another aspect of the present disclosure, the at least one ontology is formed independently from the identifying of the at least one domain-specific skill from the cleaned raw data.

According to a further aspect of the present disclosure, the one or more data sources include at least a task storage.

According to yet another aspect of the present disclosure, the one or more data sources include at least a message storage.

According to a further aspect of the present disclosure, the raw data is text data.

According to another aspect of the present disclosure, the corresponding level is determined by a number of tasks performed associated with the identified at least one ontology.

According to a further aspect of the present disclosure, the at least one ontology includes multiple ontologies, and the corresponding level is displayed for each of the multiple ontologies.

According to a further aspect of the present disclosure, the automatic assigning is performed based on highest level for an ontology among the multiple ontologies.

According to a further aspect of the present disclosure, the multiple ontologies and the corresponding levels for the developer are displayed as a singular bar.

According to a further aspect of the present disclosure, the multiple ontologies and corresponding levels for the developer are displayed in different colors.

According to a further aspect of the present disclosure, the data cleaning includes removal of extraneous information or noise.

According to a further aspect of the present disclosure, the method further includes automatically recommending, by the processor, a new position based on the evidenced at least one ontology and corresponding level.

According to a further aspect of the present disclosure, the skill matching executes at least two machine learning models, and the at least two machine learning models includes a rule based model and a large language model.

According to a further aspect of the present disclosure, the rule based model utilizes the at least one ontology to detect a presence of a skill term corresponding to the at least one ontology, and the skill term includes an exact term, a synonym, an acronym or a misspelling of the skill term.

According to a further aspect of the present disclosure, the large language model further processes an output provided by the rule based model, and the large language model utilizes in-context learning to extract a list of skill terms from the raw data.

According to an aspect of the present disclosure, a system for evidencing skills of a developer is provided. The system includes a memory, a display and a processor. The system is configured to perform: extracting, from multiple databases, a list of terms and corresponding definitions; removing at least one general term from the extracted list of terms and corresponding definitions for identifying multiple skills; grouping the identified multiple skills for forming at least one ontology based on similarity; acquiring, from one or more data sources, raw data; performing data cleaning on the acquired raw data; identifying at least one domain-specific skill from the cleaned raw data; performing skill matching by comparing the at least one domain-specific skill against the at least one ontology; when the at least one domain-specific skill matches with the at least one ontology, determining that the at least one ontology is evidenced for the developer; performing analytics to identify and display, on a display, the evidenced at least one ontology and corresponding level; and automatically assigning at least one task based on the performed analytics.

According to another aspect of the present disclosure, a non-transitory computer readable storage medium that stores a computer program for evidencing skills of a developer is provided. The computer program, when executed by a processor, causes a system to perform multiple processes including: extracting, from multiple databases, a list of terms and corresponding definitions; removing at least one general term from the extracted list of terms and corresponding definitions for identifying multiple skills; grouping the identified multiple skills for forming at least one ontology based on similarity; acquiring, from one or more data sources, raw data; performing data cleaning on the acquired raw data; identifying at least one domain-specific skill from the cleaned raw data; performing skill matching by comparing the at least one domain-specific skill against the at least one ontology; when the at least one domain-specific skill matches with the at least one ontology, determining that the at least one ontology is evidenced for the developer; performing analytics to identify and display, on a display, the evidenced at least one ontology and corresponding level; and automatically assigning at least one task based on the performed analytics.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 illustrates a method for performing developer domain specific skill extraction and authenticating a listing of skills of a developer in accordance with an exemplary embodiment.

FIG. 6 illustrates exemplary prompts for extracting a particular skill from raw data in accordance with an exemplary embodiment.

DETAILED DESCRIPTION

Figure 1:
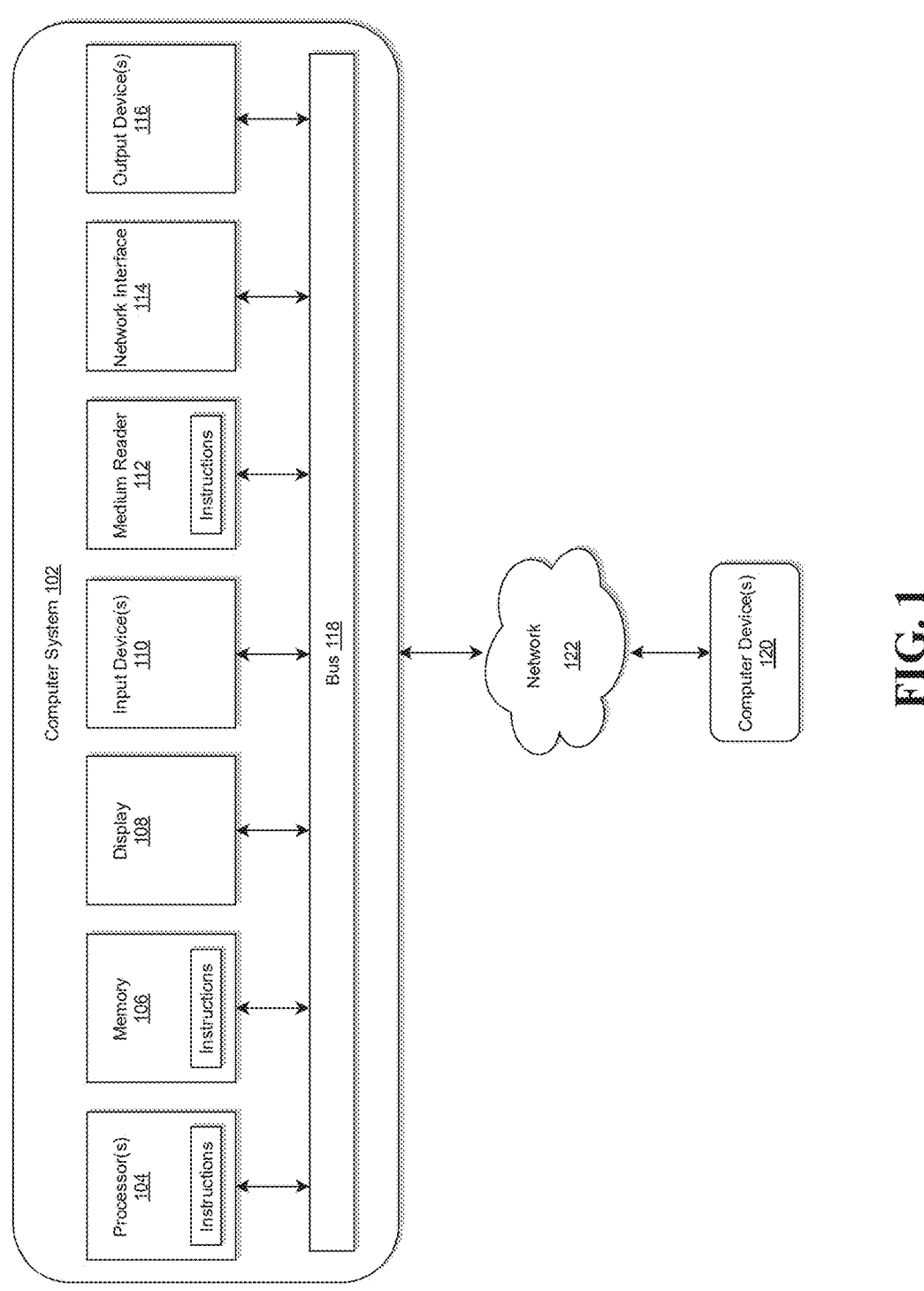
FIG. 1 illustrates a computer system for implementing a domain-specific skill extraction (DSSE) system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a domain-specific skill extraction (DSSE) system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, or the like.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
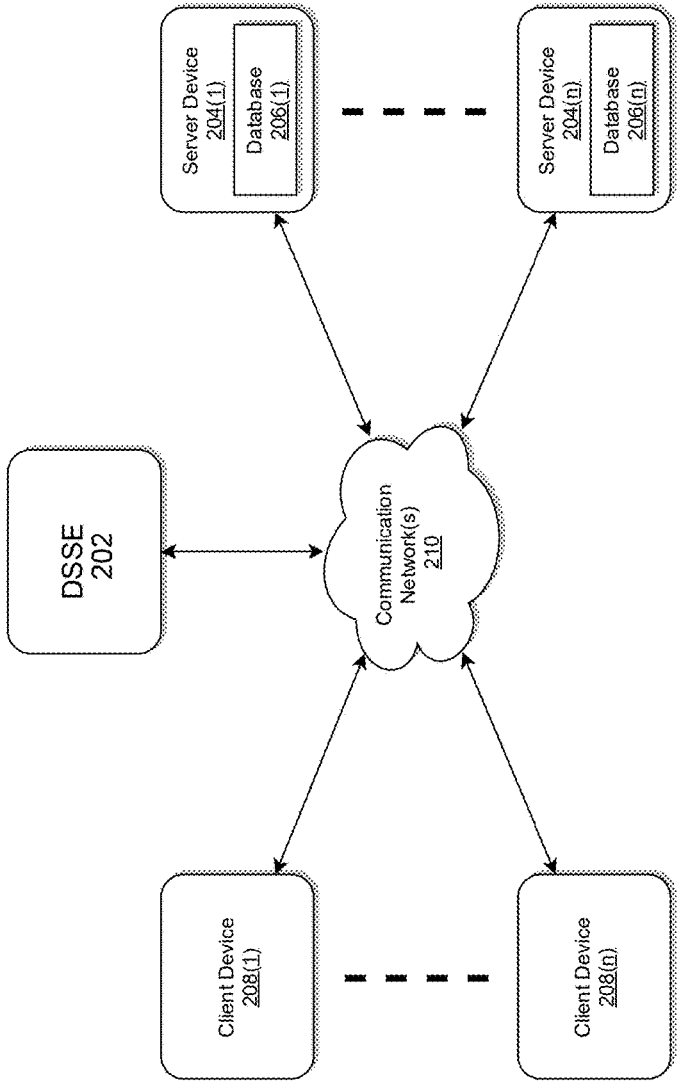
FIG. 2 illustrates an exemplary diagram of a network environment with a DSSE system in accordance with an exemplary embodiment.

FIG. 2 illustrates an exemplary diagram of a network environment with a DSSE system in accordance with an exemplary embodiment.

A DSSE system 202 may be implemented with one or more computer systems similar to the computer system 102 as described with respect to FIG. 1.

The DSSE system 202 may store one or more applications that can include executable instructions that, when executed by the DSSE system 202, cause the DSSE system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the DSSE system 202 itself, may be located in virtual server(s) running in a cloud-based computing environment rather than being tied to one or more specific physical network computing devices. Also, the application(s) may be running in one or more virtual machines (VMs) executing on the DSSE system 202. Additionally, in one or more embodiments of this technology, virtual machine(s) running on the DSSE system 202 may be managed or supervised by a hypervisor.

In the network environment 200 of FIG. 2, the DSSE system 202 is coupled to a plurality of server devices 204(1)-204(*n*) that hosts a plurality of databases 206(1)-206(*n*), and also to a plurality of client devices 208(1)-208(*n*) via communication network(s) 210. According to exemplary aspects, databases 206(1)-206(*n*) may be configured to store data that relates to distributed ledgers, blockchains, user account identifiers, biller account identifiers, and payment provider identifiers. A communication interface of the DSSE system 202, such as the network interface 114 of the computer system 102 of FIG. 1, operatively couples and communicates between the DSSE system 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DSSE system 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DSSE system 202 may be a standalone device or integrated with one or more other devices or apparatuses, such as one or more of the server devices 204(1)-204(*n*), for example. In one particular example, the DSSE system 202 may be hosted by one of the server devices 204(1)-204(*n*), and other arrangements are also possible. Moreover, one or more of the devices of the DSSE system 202 may be in the same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the DSSE system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store metadata sets, data quality rules, and newly generated data.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204

(1)-204($n$) may contain a plurality of network computing devices that operate using a master/slave approach, whereby one of the network computing devices of the server devices 204(1)-204($n$) operates to manage and/or otherwise coordinate operations of the other network computing devices.

The server devices 204(1)-204($n$) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208($n$) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204($n$) or other client devices 208(1)-208($n$).

According to exemplary embodiments, the client devices 208(1)-208($n$) in this example may include any type of computing device that can facilitate the implementation of the DSSE system 202 that may efficiently provide a platform for implementing a cloud native DSSE system module, but the disclosure is not limited thereto.

The client devices 208(1)-208($n$) may run interface applications, such as standard web browsers or standalone client applications, which may provide an interface to communicate with the DSSE system 202 via the communication network(s) 210 in order to communicate user requests. The client devices 208(1)-208($n$) may further include, among other features, a display device, such as a display screen or touchscreen, and/or an input device, such as a keyboard, for example.

Although the exemplary network environment 200 with the DSSE system 202, the server devices 204(1)-204($n$), the client devices 208(1)-208($n$), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DSSE system 202, the server devices 204(1)-204($n$), or the client devices 208(1)-208($n$), for example, may be configured to operate as virtual instances on the same physical machine. For example, one or more of the DSSE system 202, the server devices 204 (1)-204($n$), or the client devices 208(1)-208($n$) may operate on the same physical device rather than as separate devices communicating through communication network(s) 210. Additionally, there may be more or fewer DSSE system 202, server devices 204(1)-204($n$), or client devices 208(1)-208 ($n$) than illustrated in FIG. 2. According to exemplary embodiments, the DSSE system 202 may be configured to send code at run-time to remote server devices 204(1)-204 ($n$), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
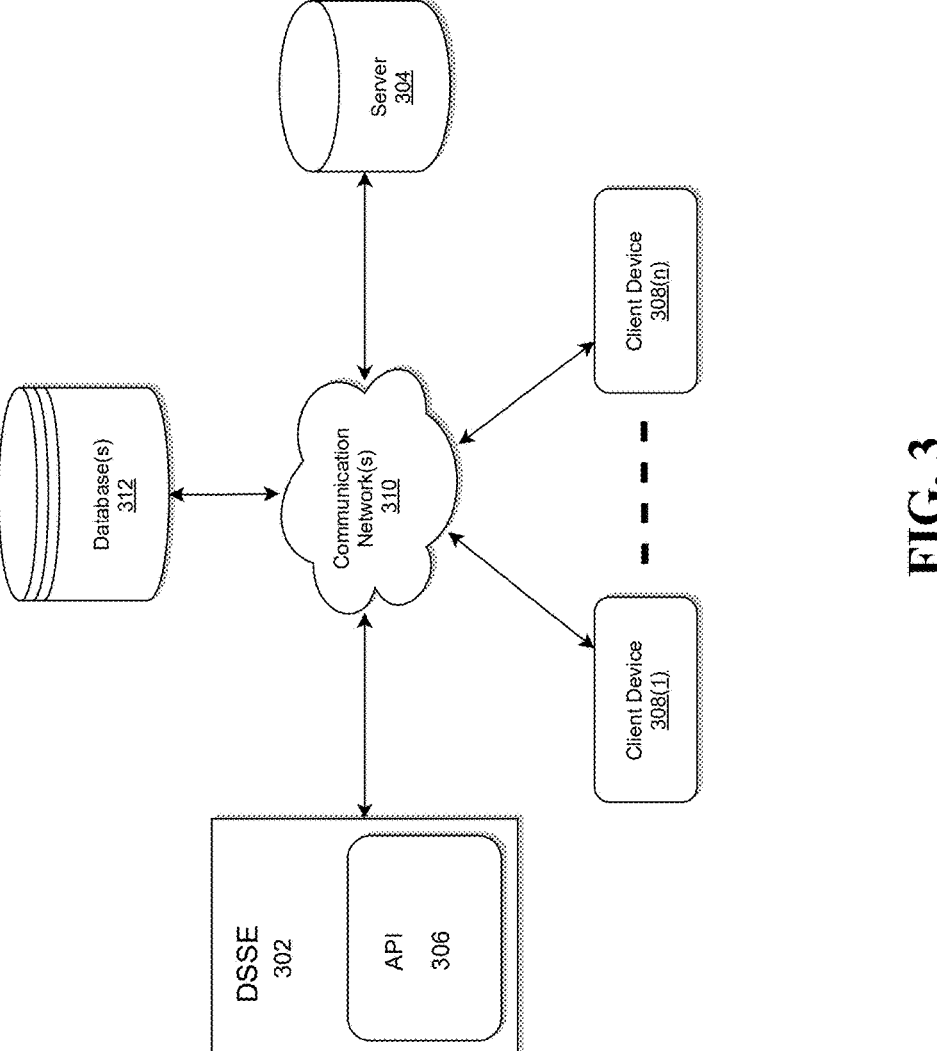
FIG. 3 illustrates a system diagram for implementing a DSSE system in accordance with an exemplary embodiment.

FIG. 3 illustrates a system diagram for implementing a DSSE system in accordance with an exemplary embodiment.

As illustrated in FIG. 3, the system 300 may include a DSSE system 302 within which a group of API modules 306 is embedded, a server 304, a database(s) 312, a plurality of client devices 308(1) . . . 308($n$), and a communication network 310.

According to exemplary embodiments, the DSSE system 302 including the API modules 306 may be connected to the server 304, and the database(s) 312 via the communication network 310. Although there is only one database that has been illustrated, the disclosure is not limited thereto. Any number of databases may be utilized. The DSSE system 302 may also be connected to the plurality of client devices 308(1) . . . 308($n$) via the communication network 310, but the disclosure is not limited thereto.

According to exemplary embodiment, the DSSE system 302 is described and shown in FIG. 3 as including the API modules 306, although it may include other rules, policies, modules, databases, or applications, for example. According to exemplary embodiments, the database(s) 312 may be embedded within the DSSE system 302. According to exemplary embodiments, the database(s) 312 may be configured to store configuration details data corresponding to a desired data to be fetched from one or more data sources, but the disclosure is not limited thereto.

According to exemplary embodiments, the API modules 306 may be configured to receive real-time feed of data or data at predetermined intervals from the plurality of client devices 308(1) . . . 308($n$) via the communication network 310.

The API modules 306 may be configured to implement a user interface (UI) platform that is configured to enable DSSE system as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308($n$) are illustrated as being in communication with the DSSE system 302. In this regard, the plurality of client devices 308(1) . . . 308($n$) may be "clients" of the DSSE system 302 and are described herein as such. Nevertheless, it is to be known and understood that the plurality of client devices 308(1) . . . 308($n$) need not necessarily be "clients" of the DSSE system 302, or any entity described in association therewith herein.

Any additional or alternative relationship may exist between either or both of the plurality of client devices 308(1) . . . 308(n) and the DSSE system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the DSSE system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The DSSE system 302 may be the same or similar to the DSSE system 202 as described with respect to FIG. 2, including any features or combination of features described with respect thereto.

FIG. 4 illustrates a method for performing developer domain specific skill extraction and authenticating a listing of skills of a developer in accordance with an exemplary embodiment.

According to exemplary aspects, FIG. 4 illustrates an end-to-end method, which automates a process of domain-specific skill extraction from raw data present in developer task and group chats. Although the domain-specific skill extraction process is described with respect to raw data included in the developer task backlog and group chats, aspects of the present disclosure are not limited thereto, such that raw data from other sources (e.g., white papers, publications, patent application submissions, speaking engagement, and etc.) may be utilized. An output of the domain-specific skill extraction process may then be used by various downstream analytics systems. The end-to-end method may include five sub-process flows, which includes (1) extraction and grouping of desired skills, (2) pre-processing of the raw data associated with a developer, (3) a rule-based model execution, (4) a large language model execution, and (5) analytics tool execution.

In operation 401, a list of technical terms and definitions may be extracted from one or more databases or sources. For example, with respect to cloud skills, extracted terms may include various cloud services utilized by an organization, such as Aurora. The respective extracted technical terminology may be related to one or more corresponding skills, such as SQL database. In an example, the list of technical terms corresponding to one or more technical skills may be extracted from a glossary or internal documentations. However, aspects of the present disclosure are not limited thereto, such that the technical terms may be extracted from external sources, training materials, vendors and the like.

In operation 402, the extracted list of terms and definition are then processed to remove extraneous information, such as general or non-technical terms, and/or noise for identifying one or more technical skills corresponding to the remaining technical terms. According to aspects, the extraneous information is removed from the extracted data for more efficient or faster CPU processing and to free up unnecessary memory utilization. More specifically, the extracted list of terms and definition may include information that may not be relevant in grouping or formation of ontologies.

In operation 403, related technical skills may be condensed or grouped together to form an ontology. According to exemplary aspects, the grouping may be performed semi-automatically via affinity clustering based on similarity of the technical skills. More specifically, for performing affinity clustering, definitions of various terms extracted may be utilized, and a sentence embedding may be extracted using a language model. In an example, the sentence embedding may refer to a process of representing variable-length sentences as fixed-length vectors, thereby capturing their semantic meaning. Such a process may enable comparison of sentence similarity by measuring distance or similarity between these vectors. Once the sentence embedding are extracted, clustering may be performed based on the sentence embedding for obtaining groups of related entities. These clusters may form an ontology, which may be a representative form of final list of skills, against which a skill matching operation may be performed to compare skills within a given text (e.g., select portions of processed or cleaned raw data) input.

Although operations 401-403 may be indicated as being performed prior to operations 404-405 based on their numerical designations, aspects of the present disclosure are not limited thereto, such that operations 401-403 may be executed independently or in parallel with operations 404-405. For example, operations 404-405 may be performed prior to or in parallel with execution of operations 401-403.

In operation 404, raw data may be acquired from one or more data sources. In an example, one of the data sources may include a storage of technical tasks to be performed by one or more developers, and raw data may include a combination of field data including descriptive text. Another of the data sources may include a group chat messaging data, and raw data may include text messages exchanged in a group chat. However, aspects of the present disclosure are not limited thereto, such that data sources may include emails, corresponding attachments, presentations, whitepapers, previous publications, patent application submission, and the like. Further, raw data may include image, video or video data that may be transcribed.

In operation 405, data cleaning is performed on the acquired raw data for identifying one or more domain-specific skills. According to exemplary aspects, the raw data may include extraneous information, noise, and potentially misleading information. For example, URLs or log data may include various technical terms as they point to documentation pages, however, such references do not suggest that the author him or herself of the message has actual knowledge about the noted technical terms. Accordingly, URLs and log error traces pasted in the original text may be removed for avoiding potential false-positives and to increase accuracy in results. Further, at least since extraneous and potentially misleading information are removed prior to performance of skill matching operation, computing resources (e.g., CPU) may be more efficiently utilized as certain information may be ignored without having to be processed and provide more accurate results.

In operation 406, skill matching operation is performed based on an output provided by operation 403 and an output provided by operation 405. According to exemplary aspects, the skill matching operation may be performed by comparing the identified one or more domain-specific skills with at least one ontology generated in operation 403. More specifically, the skill matching operation may find one or more extracted skills from a particular glossary or documentation grouped in an ontology in a processed raw data or message/text outputted by operation 405. When at least one domain-specific skill matches with the at least one ontology, the ontology or associated skill(s) are evidenced for the developer.

The skill matching operation 406 may include execution of a combination of at least two machine learning (ML) or artificial intelligence (AI) models or algorithms. The at least two ML or AI models may include a rule based model and a large language model (LLM).

According to exemplary aspects, the rule based model may be configured for precision and may utilized the generated ontology to detect occurrences of terms in the cleaned or processed text, as outputted by the raw data acquisition and data cleaning 506 module. Multiple rules may be provided to consider exact occurrences, as well as synonyms, acronyms and possible misspelled words, when predicting that the author of the processed text needed the skill in their work. At least one of the multiple rules, if not all, may be built based on the generated ontology.

According to exemplary aspects, the LLM may be configured to complement the rule based model, and improve recall. The LLM may use in-context learning, to extract a list of skill terms from the raw message or text input. As exemplary illustrated in FIG. 6, four examples are provided in a prompt. In each example, a prompt may specify to extract certain skill (e.g., Skill 4) from a particular raw message or input (e.g., Raw Message 4). The prompts may be optimized to achieve best scores on a small evaluation dataset.

In an example, AI or ML algorithms may be generative, in that the AI or ML algorithms may be executed to perform data pattern detection, and to provide an output based on the data pattern detection. More specifically, an output may be provided based on a historical pattern of data, such that with more data or more recent data, more accurate outputs may be provided. Accordingly, the ML or AI models may be constantly updated after a predetermined number of runs or iterations are initially performed to provide initial training. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors' analysis, logistic regression analysis, N-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

Moreover, the above noted ML or AI models may not be constrained to predict only from a designated list of terms. Accordingly, in order to improve results and provide broader processing capabilities, outputs may be processed and assigned to most similar term from an existing list. In an example, such matching may be performed based on the generated ontology and using cosine similarity of the embeddings with all the representatives and terms in their clusters. Cosine similarity of the embeddings may measure similarity between two embedding vectors. More specifically, similarity may be measured by the cosine of an angle between the two embedding vectors to determine whether or not the two embedding vectors are pointing in the same direction within a deviation below a reference threshold. Such similarity measure may be used to measure similarity in text data.

In operation 407, analysis to identify skills and corresponding levels is performed. According to exemplary aspects, the performance of the analysis operation includes receiving an output provided by the skill matching operation and analyzing the output to identify evidence set of skills or ontology as well as corresponding indications of experience. Moreover, the analysis may further identify areas of strength and weaknesses in skills. More specifically, the analysis operation merge the outputs from the operation 403 and operation 405, and aggregate data in one or more views to provide various aspects of evidenced skills of one or more developers. In an example, one view may describe the percentage of work done by a developer, which relates to a specific skill over a period of time. Another view may extract the most common discussion topics regarding the list of technical terms corresponding to respective skills. Further, an output of the analytics operation may be updated dynamically or intermittently updated to reflect most current skill set of the developers.

Figure 7:
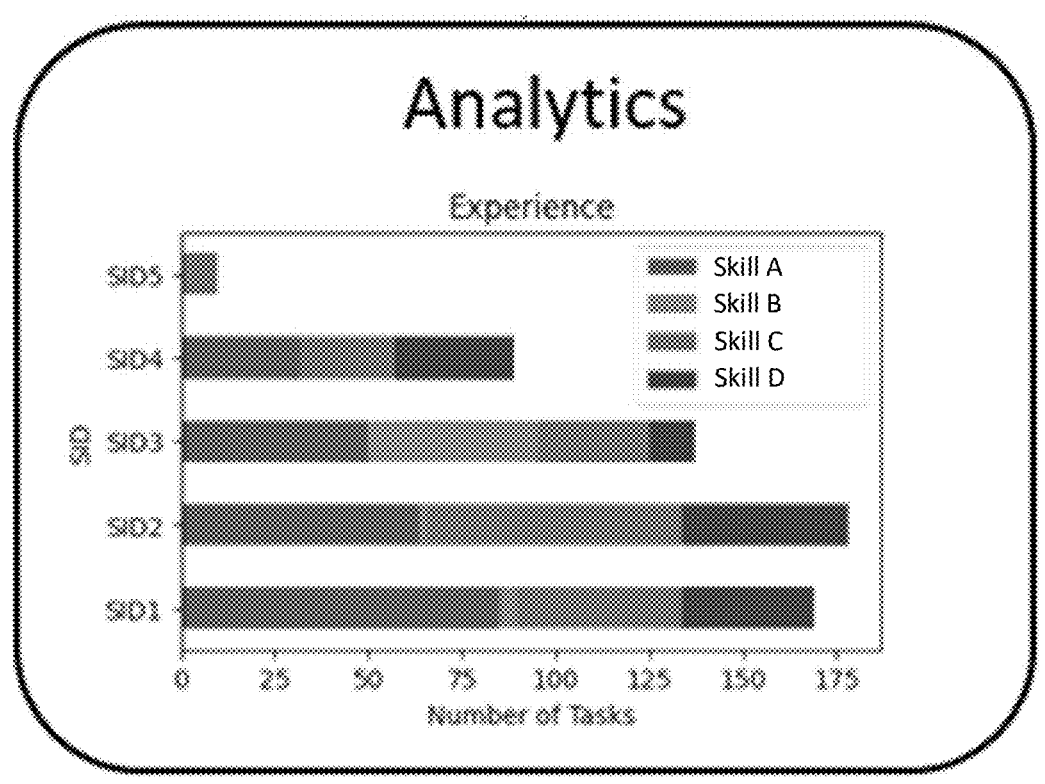
FIG. 7 illustrates an exemplary display of analytics metrics in accordance with an exemplary embodiment.

As illustrated in FIG. 7, five different developers (i.e., SID1 developer, SID2 developer, SID3 developer, SID4 developer and SID5 developer) with difference levels of evidenced experienced are provided as measured in number of tasks completed. SID2 developer has the largest amount of total evidenced experience, followed by SID1 developer, SID3 developer, SID4 developer and SID5 developer.

Further, each developer's total evidenced experience may be divided into sub-categories of experience with respect to certain skills and displayed as a single continuous bar, with different colors indicating different skills or ontology. For example, the SID1 developer has second largest amount of total evidenced experience, but has largest amount of evidenced experience in Skill A among the five developers. Similarly, even though the SID2 developer may be the most experienced developer in a group, the analytics output of FIG. 7 indicates that the respective developer is weak in Skill B, much so that a more junior developer having an identifier of SID3 having more experience in Skill B may be better suited for projects seeking Skill B despite having lower overall evidenced experience.

As illustrated in FIG. 7, developers may also have differing amounts of evidenced experience for different skills (e.g., Skill A, Skill B, Skill C and Skill D), and some may lack certain skills entirely. For example, the SID4 developer may have evidenced an average amount of experience in handling technical work or tasks, the SID4 developer does not have any evidenced experience with Skill B. Accordingly, despite the SID4 developer's overall experience, the SID4 developer may be unsuitable for projects requiring Skill B.

Further to the above, although not illustrated, the performance of the analytics operation may provide a number of tasks performed with respect to each skill along with the visual graph. Further, visual indicators (e.g., color, icon, pattern, highlighting or etc.) may be added to additionally indicate general levels of proficiency once the number of tasks exceeds certain thresholds. For example, if a developer performs more than 75 tasks for Skill A, the respective developer may be deemed to be at a master level. If the developer performs more than 50 tasks but less than 75 tasks, the developer may be deemed to be at an intermediate level. By providing additional indications without requiring additional landscape on a displayed image, further information may be provided to a viewer more quickly for identifying desired personnel. In an example, the thresholds may be set differently for different skills.

In operation 408, automatic assignments of tasks, projects, training or the like may be performed based on the analysis performed in operation 407. In an example, automatic assignments may be performed based on highest level of skill or ontology indicated among multiple skills or ontologies evidenced for a respective developer.

Lastly, operation 409 may automatically assign projects, training, and recommend positions/jobs within an organization for internal mobility. According to exemplary aspects and referring to FIG. 7, when a project specifies a developer with proficiency in Skill B, the respective project may be automatically assigned to the SID3 developer over SID1 and SID2 developers that have limited experience in Skill B despite having more experience overall. Further, SID5 developer may be automatically assigned to various training due to lack of proficiency in many skills. Also, SID1 developer may be recommended to apply to a higher position within the organization requiring expertise in Skill A.

Figure 5:
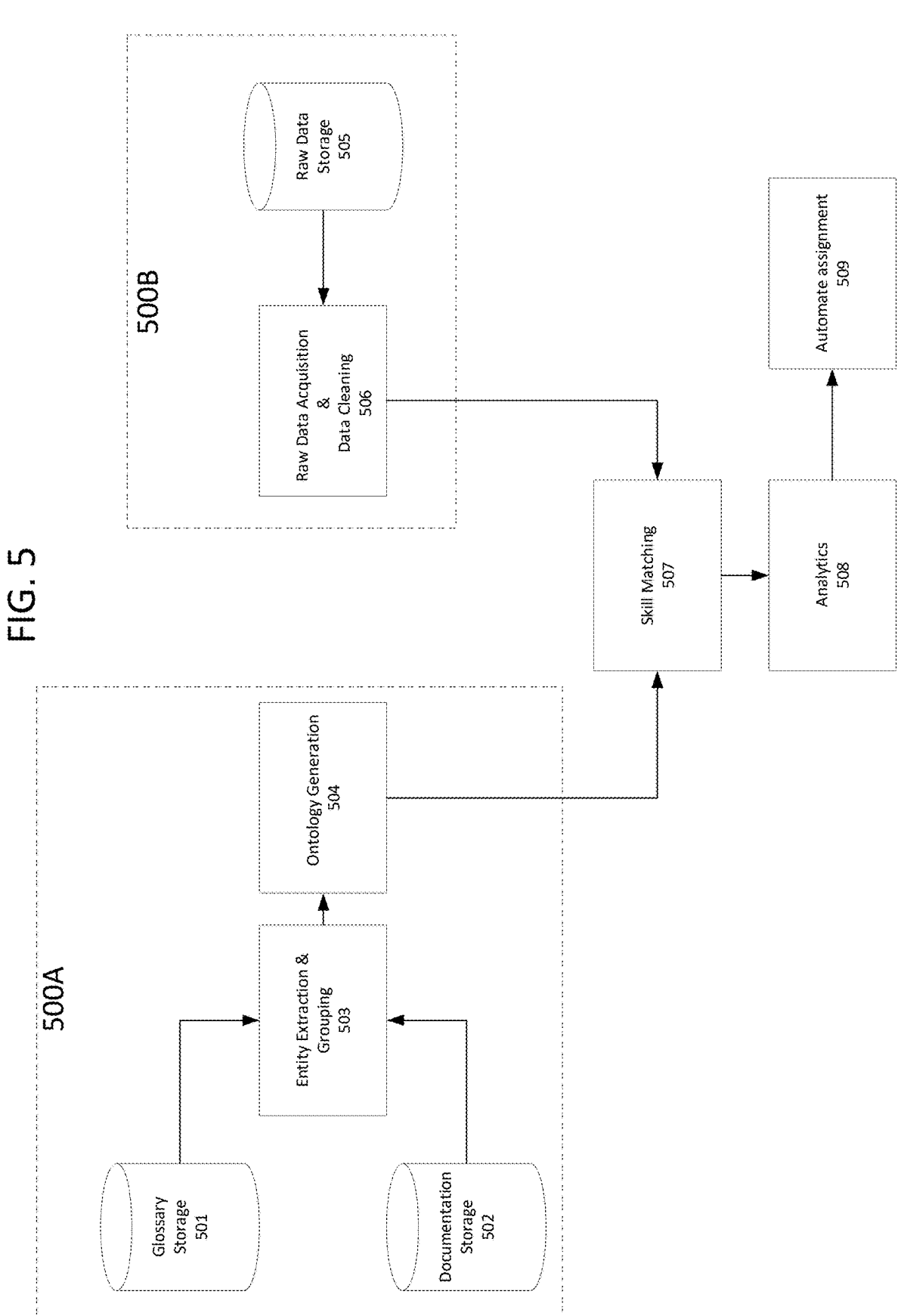
FIG. 5 illustrates a system flow for performing developer domain specific skill extraction and authenticating a listing of skills of a developer in accordance with an exemplary embodiment.

FIG. 5 illustrates a system flow for performing developer domain specific skill extraction and authenticating a listing of skills of a developer in accordance with an exemplary embodiment.

According to exemplary aspects, FIG. 5 illustrates an end-to-end pipeline, which automates a process of domain-specific skill extraction from raw data present in developer task and group chats. Although the domain-specific skill extraction process is described with respect to raw data included in the developer task and group chats, aspects of the present disclosure are not limited thereto, such that raw data from other sources (e.g., white papers, publications, patent application submissions, speaking engagement, and etc.) may be utilized. An output of the domain-specific skill extraction process may then be used by various downstream analytics systems. The end-to-end method may include five components, which includes (1) extraction and grouping of desired skills, (2) pre-processing of the raw data, (3) a rule-based system, (4) a large language model prompting system, and (5) analytics tools.

As illustrated in FIG. 5, the extraction and grouping of desired skills component 500A of the end-to-end pipeline may be performed by entity extraction and grouping 503 module and ontology generation 504 module, using data from a glossary storage 501 and a documentation storage 502. More specifically, in the entity extraction and grouping 503 module, data included in the glossary storage 501 and the documentation storage 502 may be scanned for identifying relevant information.

In the entity extraction and grouping 503 module, a list of terms and their corresponding definitions from any given documentation may be extracted from the glossary storage 501 and the documentation storage 502. For example, with respect to cloud skills, certain cloud networking terminologies, such as various cloud services, may be extracted from the glossary storage 501. The extracted terminology may be associated with other complementary skills, such as SQL databases.

Further, in order to curate a list of desired skills, general, non-technical or extraneous terms may be removed, and remaining terms may be grouped together for more accurate and efficient processing by computing resources. According to exemplary aspects, the grouping may be performed semi-automatically via affinity clustering. More specifically, for performing affinity clustering, definition of various terms provided by the glossary storage 501 may be utilized, and a sentence embedding may be extracted using a language model. In an example, the sentence embedding may refer to a process of representing variable-length sentences as fixed-length vectors, thereby capturing their semantic meaning. Such a process may enable comparison of sentence similarity by measuring distance or similarity between these vectors. Once the sentence embedding are extracted, clustering may be performed based on the sentence embedding for obtaining groups of related entities. These clusters may form an ontology, which may be a representative form of final list of skills, against which a skill matching 507 module compares skills within a given text (e.g., select portions of processed or cleaned raw data) provided by the raw data acquisition and data cleaning 506 module.

Further, the pre-processing of raw data component 500B of the end-to-end pipeline may be performed by the raw data acquisition and data cleaning 506 module using raw data from a raw data storage 505. In an example, the raw data storage 505 may include data or information related to tasks that were assigned to and/or performed by an employee. Further, the raw data storage 505 may include message/chat exchanges, including group chats. However, aspects of the present disclosure are not limited thereto, such that emails, corresponding attachments, presentations, whitepapers, previous publications, patent application submission, and the like may be included.

According to exemplary aspects, raw data stored in the raw data storage 505 may include extraneous information, noise, and potentially misleading information. For example, URLs or log data may include various technical terms as they point to documentation pages, however, such references do not suggest that the author him or herself of the message has actual knowledge about the noted technical terms. Accordingly, URLs and log error traces pasted in the original text may be removed for avoiding potential false-positives and to increase accuracy in results. Further, at least since extraneous and noise are removed prior to performance of skill matching operation by the skill matching 507 module, computing resources (e.g., CPU) may be more efficiently utilized as certain information may be ignored without having to be processed.

According to further aspects, the skill matching 507 module may be configured to perform a match between the processed raw data and the generated ontology. More specifically, the skill matching 507 module may be configured to find one or more extracted skills from a particular glossary or documentation stored in the glossary storage 501 or the documentation storage 502, respectively, in a processed text outputted by the raw data acquisition and data cleaning 506 module. The skill matching 507 module may use a combination of at least two ML or AI models or algorithms. The at least two ML or AI models may include a rule based model and a large language model (LLM).

According to exemplary aspects, the rule based model may be configured for precision and may utilized the generated ontology to detect occurrences of terms in the cleaned or processed text, as outputted by the raw data acquisition and data cleaning 506 module. Multiple rules may be provided to consider exact occurrences, as well as synonyms, acronyms and possible misspelled words, when predicting that the author of the processed text needed the skill in their work. At least one of the multiple rules, if not all, may be built based on the generated ontology.

According to exemplary aspects, the LLM may be configured to complement the rule based model, and improve recall. The LLM may use in-context learning, to extract a list of skill terms from the raw message or text input. As exemplary illustrated in FIG. 6, four examples are provided in a prompt. In each example, a prompt may specify to extract certain skill (e.g., Skill 4) from a particular raw message or input (e.g., Raw Message 4). The prompts may be optimized to achieve best scores on a small evaluation dataset.

Moreover, the above noted ML or AI models may not be constrained to predict only from a designated list of terms. Accordingly, in order to improve results and provide broader processing capabilities, outputs may be processed and assigned to most similar term from an existing list. In an example, such matching may be performed based on the generated ontology and using cosine similarity of the embeddings with all the representatives and terms in their clusters. Cosine similarity of the embeddings may measure similarity between two embedding vectors. More specifically, similarity may be measured by the cosine of an angle between the two embedding vectors to determine whether or not the two embedding vectors are pointing in the same direction within a deviation below a reference threshold. Such similarity measure may be used to measure similarity in text data.

According to exemplary aspects, the analytics 508 module receives an output provided by the skill matching 507 module and performs analysis to identify verified set of skills as well as corresponding experience. Moreover, the analysis may further identify areas of strength and weaknesses in skills. More specifically, the analytics 508 may be configured to merge the outputs of the ontology generation 504 module and the acquire raw data and perform data cleaning 508 module, and aggregate data in different views. In an example, one view may describe the percentage of work done by a developer, which relates to a specific skill over a period. Another view may extract the most common discussion topics regarding the list of technical terms corresponding to respective skills. Further, analytics 508 module may be designed according to business, and may be dynamically or intermittently updated to reflect verified skill set of developers.

As illustrated in FIG. 7, the SID1 developer has the largest amount of evidenced experience with Skill A, the second largest amount of evidenced experience with Skill C, and the third largest amount of evidenced experience with Skill D. Further, the analytics 508 module may show that the SID2 developer may be the most experienced developer on the team, but has very limited evidenced experience in Skill B. Accordingly, even though the SID2 developer may be the most experienced developer in a group, the analytics 508 module may indicate that the respective developer is weak in Skill B, much so that a more junior SID3 developer having more experience in Skill B may be better suited for projects seeking Skill B.

Further to the above, although not illustrated, the analytics 508 module may provide a number of tasks performed with respect to each skill along with the visual graph. Further, visual indicators may be added to additionally indicate general levels of proficiency once the number of tasks exceeds certain thresholds. For example, if a developer performs more than 75 tasks for Skill A, the respective developer may be deemed to be at a master level. If the developer performs more than 50 tasks but less than 75 tasks, the developer may be deemed to be at an intermediate level. In an example, the thresholds may be set differently for different skills.

Lastly, the automate assignment 509 module may be configured to automatically assign projects, training, and recommend positions/jobs within an organization for internal mobility. According to exemplary aspects and referring to FIG. 7, when a project specifies a developer with proficiency in Skill B, the DSSE system may automatically assign the SID3 developer to the project over SID1 and SID2 developers that have limited experience in Skill B despite having more experience overall. Further, the SID5 developer may be automatically assigned to various training due to lack of proficiency in many skills. Also, the SID1 developer may be recommended to apply to a higher position within the organization requiring expertise in Skill A.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for evidencing skills of a developer, the method comprising:

extracting, by a processor and from a plurality of databases, a list of terms and corresponding definitions;

removing, by the processor, at least one term from the extracted list of terms and corresponding definitions;

identifying, by the processor, a plurality of skills based on the extracted list of terms and corresponding definitions after the removing of the at least one term;

grouping, by the processor, the identified plurality of skills for forming at least one ontology based on similarity, wherein the grouping is performed using affinity clustering, and wherein the affinity clustering includes extracting a sentence embedding using a language model, the sentence embedding includes a process of representing variable-length sentences as fixed-length vectors;

acquiring, by the processor and from one or more data sources, raw data;

performing, by the processor, data cleaning on the acquired raw data;

identifying, by the processor, at least one domain-specific skill from the cleaned raw data;

performing, by the processor, skill matching by comparing the at least one domain-specific skill against the at least one ontology, wherein a similarity between the at least one domain-specific skill and the at least one ontology is measured based on a cosine of an angle formed between a first embedding vector of the at least one domain-specific skill and a second embedding vector of the at least one ontology to determine whether or not the first embedding vector and the second embedding vector are pointing in a same direction within a deviation below a reference threshold;

when the at least one domain-specific skill matches with the at least one ontology, determining that the at least one ontology is evidenced for the developer;

performing, by the processor, analytics to identify and display, on a display, the evidenced at least one ontology and corresponding level; and automatically assigning, by the processor, at least one task based on the performed analytics.

2. The method according to claim 1, wherein the plurality of databases includes a glossary storage and a document storage.

3. The method according to claim 1, wherein the at least one ontology is formed independently from the identifying of the at least one domain-specific skill from the cleaned raw data.

4. The method according to claim 1, wherein the one or more data sources include at least a task storage.

5. The method according to claim 1, wherein the one or more data sources include at least a message storage.

6. The method according to claim 1, wherein the raw data is text data.

7. The method according to claim 1, wherein the corresponding level is determined by a number of tasks performed associated with the at least one ontology.

8. The method according to claim 1, wherein the at least one ontology includes a plurality of ontologies, and wherein the corresponding level is displayed for each of the plurality of ontologies.

9. The method according to claim 8, wherein the automatic assigning is performed based on highest level for an ontology among the plurality of ontologies.

10. The method according to claim 8, wherein the plurality of ontologies and the corresponding levels for the developer are displayed as a singular bar.

11. The method according to claim 10, wherein the plurality of ontologies and corresponding levels for the developer are displayed in different colors.

12. The method according to claim 1, wherein the data cleaning includes removal of extraneous information or noise.

13. The method according to claim 1, further comprising:

automatically recommending, by the processor, a new position based on the evidenced at least one ontology and corresponding level.

14. The method according to claim 1, wherein the skill matching includes executing at least two machine learning models, and wherein the at least two machine learning models includes a rule based model and a large language model.

15. The method according to claim 14, wherein the rule based model utilizes the at least one ontology to detect a presence of a skill term corresponding to the at least one ontology, and wherein the skill term includes an exact term, a synonym, an acronym or a misspelling of the skill term.

16. The method according to claim 14, wherein the large language model further processes an output provided by the rule based model, and wherein the large language model utilizes in-context learning to extract a list of skill terms from the raw data.

17. A system for evidencing skills of a developer, the system comprising:

a memory; and a processor, wherein the system is configured to perform:

extracting, from a plurality of databases, a list of terms and corresponding definitions;

removing at least one term from the extracted list of terms and corresponding definitions;

identifying a plurality of skills based on the extracted list of terms and corresponding definitions after the removing of the at least one term;

grouping the identified plurality of skills for forming at least one ontology based on similarity, wherein the grouping is performed using affinity clustering, and wherein the affinity clustering includes extracting a sentence embedding using a language model, the sentence embedding includes a process of representing variable-length sentences as fixed-length vectors;

acquiring, from one or more data sources, raw data;

performing data cleaning on the acquired raw data;

identifying at least one domain-specific skill from the cleaned raw data;

performing skill matching by comparing the at least one domain-specific skill against the at least one ontology, wherein a similarity between the at least one domain-specific skill and the at least one ontology is measured based on a cosine of an angle formed between a first embedding vector of the at least one domain-specific skill and a second embedding vector of the at least one ontology to determine whether or not the first embedding vector and the second embedding vector are pointing in a same direction within a deviation below a reference threshold;

when the at least one domain-specific skill matches with the at least one ontology, determining that the at least one ontology is evidenced for the developer;

performing analytics to identify and display, on a display, the evidenced at least one ontology and corresponding level; and automatically assigning at least one task based on the performed analytics.

18. A non-transitory computer readable storage medium that stores a computer program for evidencing skills of a developer, the computer program, when executed by a processor, causing a system to perform a plurality of processes comprising:

extracting, from a plurality of databases, a list of terms and corresponding definitions;

removing at least one term from the extracted list of terms and corresponding definitions;

identifying a plurality of skills based on the extracted list of terms and corresponding definitions after the removing of the at least one term;

grouping the identified plurality of skills for forming at least one ontology based on similarity, wherein the grouping is performed using affinity clustering, and wherein the affinity clustering includes extracting a sentence embedding using a language model, the sentence embedding includes a process of representing variable-length sentences as fixed-length vectors;

acquiring, from one or more data sources, raw data;

performing data cleaning on the acquired raw data;

identifying at least one domain-specific skill from the cleaned raw data;

performing skill matching by comparing the at least one domain-specific skill against the at least one ontology, wherein a similarity between the at least one domain-specific skill and the at least one ontology is measured based on a cosine of an angle formed between a first embedding vector of the at least one domain-specific skill and a second embedding vector of the at least one ontology to determine whether or not the first embedding vector and the second embedding vector are pointing in a same direction within a deviation below a reference threshold;

when the at least one domain-specific skill matches with the at least one ontology, determining that the at least one ontology is evidenced for the developer;

performing analytics to identify and display, on a display, the evidenced at least one ontology and corresponding level; and automatically assigning at least one task based on the performed analytics.

\* \* \* \* \*